Sept. 11, 1956  R. H. CARTER  2,762,652
HOT SPRAY PAINTING SYSTEM
Filed Nov. 20, 1952  3 Sheets-Sheet 1
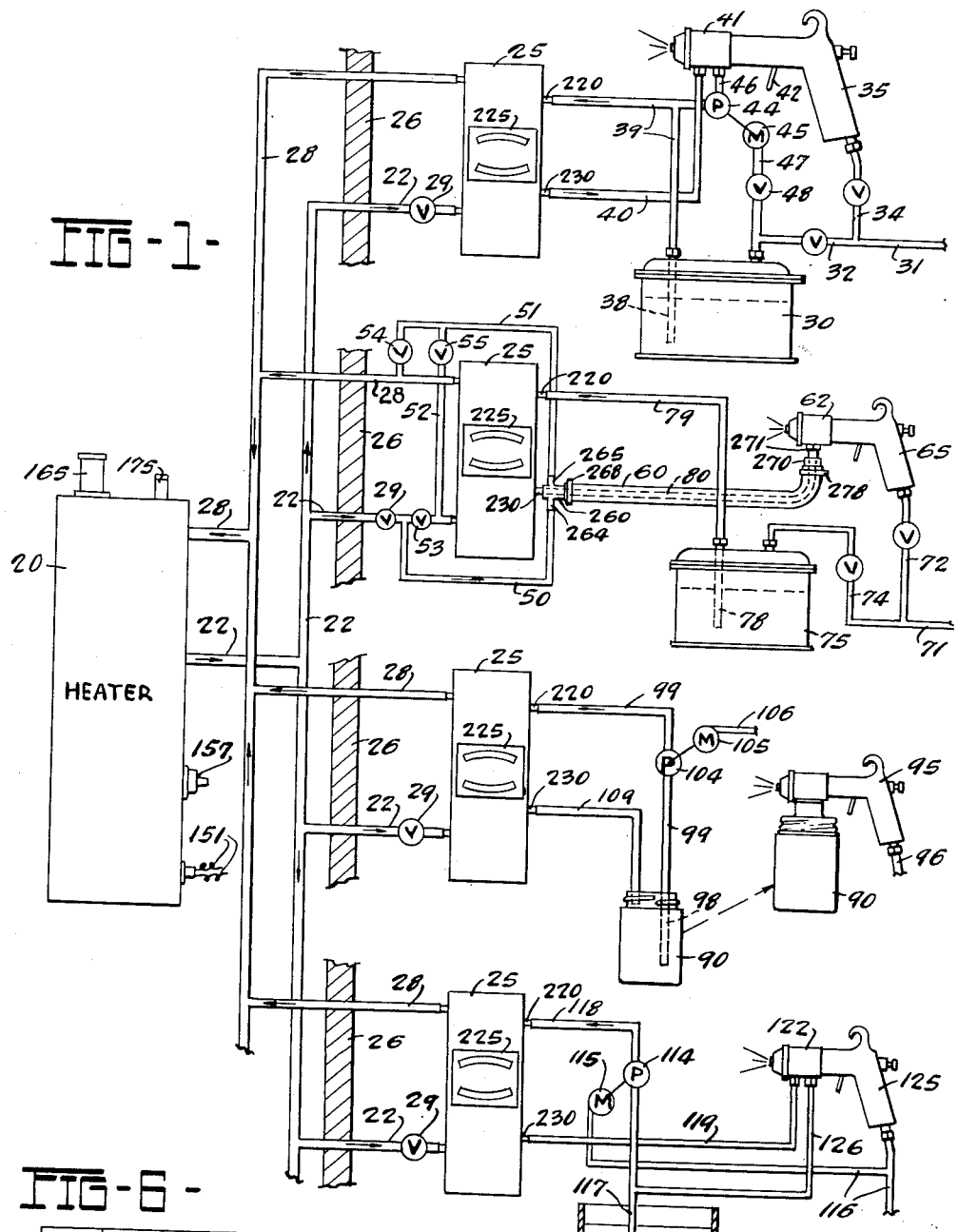
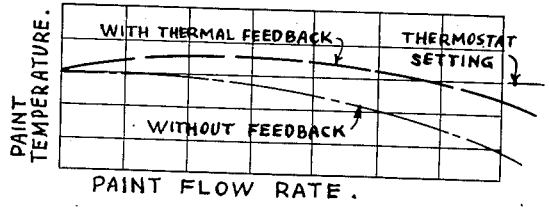
INVENTOR:
Richard H. Carter.
BY
Hugh A. Kirk
ATTY.

Sept. 11, 1956
R. H. CARTER
2,762,652
HOT SPRAY PAINTING SYSTEM
Filed Nov. 20, 1952
3 Sheets-Sheet 2
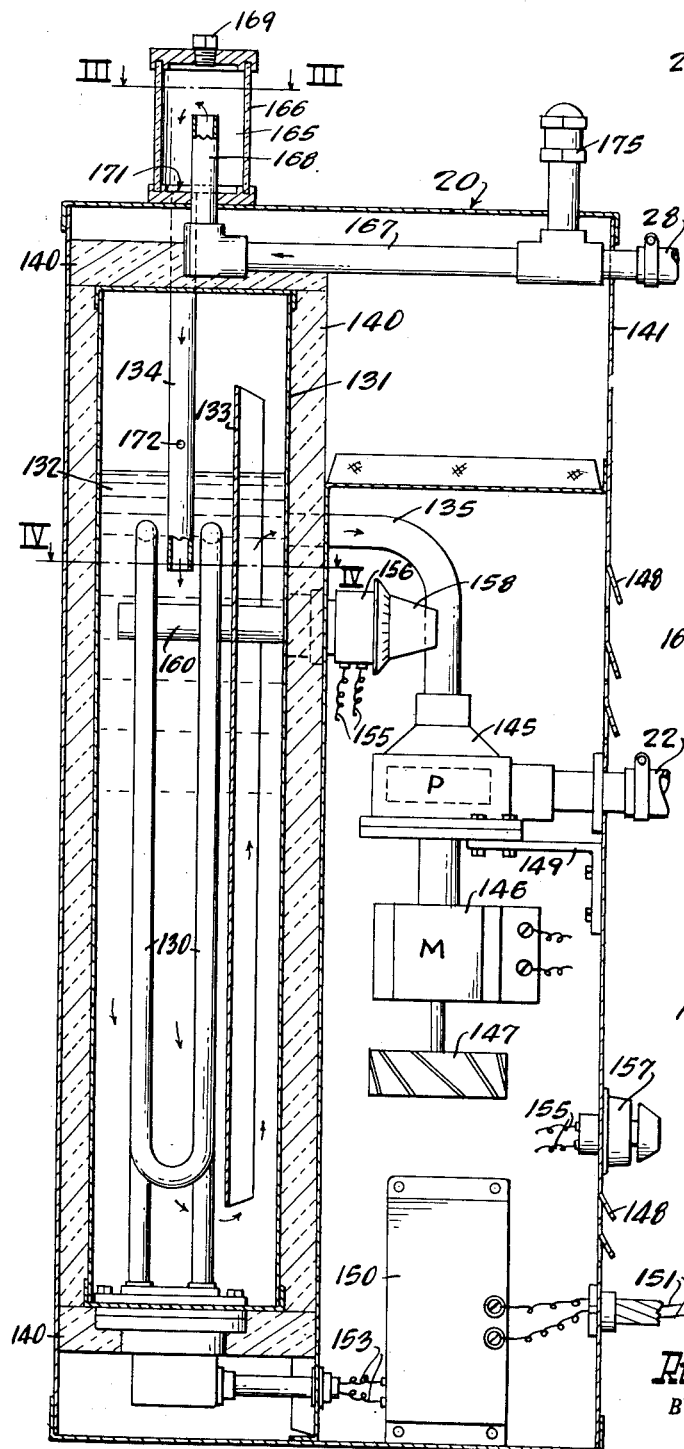
FIG-2-
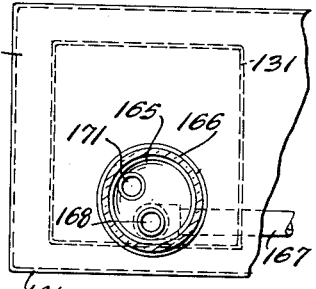
FIG-3-
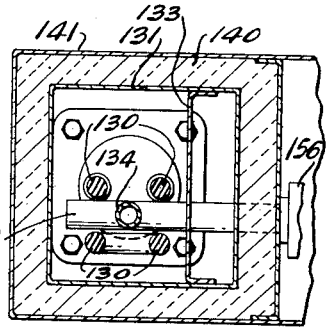
FIG-4-
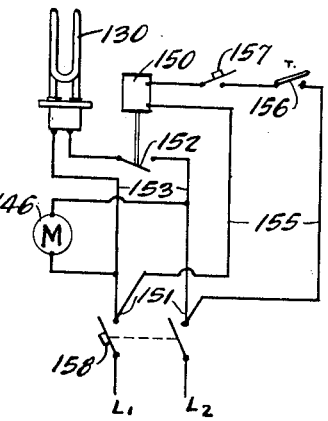
FIG-5-
INVENTOR:
Richard H. Carter
BY
Hugh A. Kirk
ATTY.

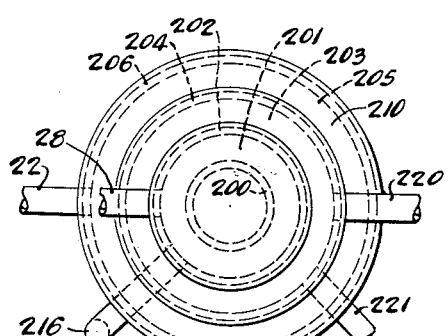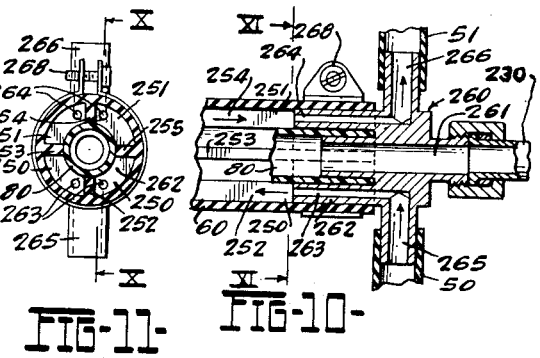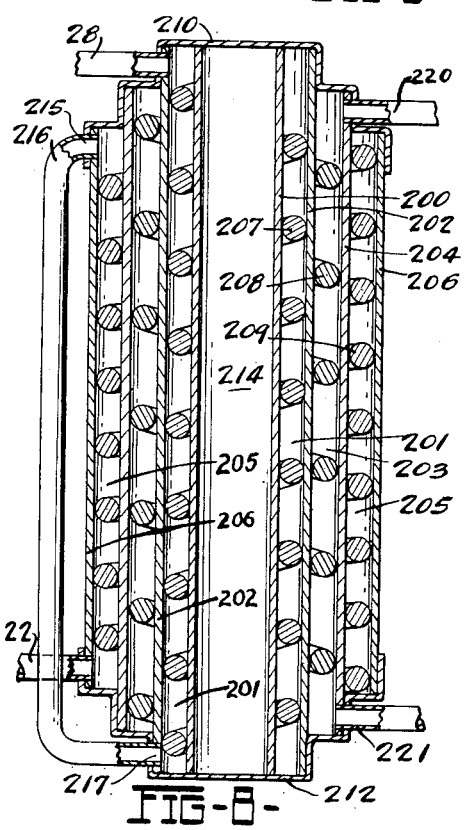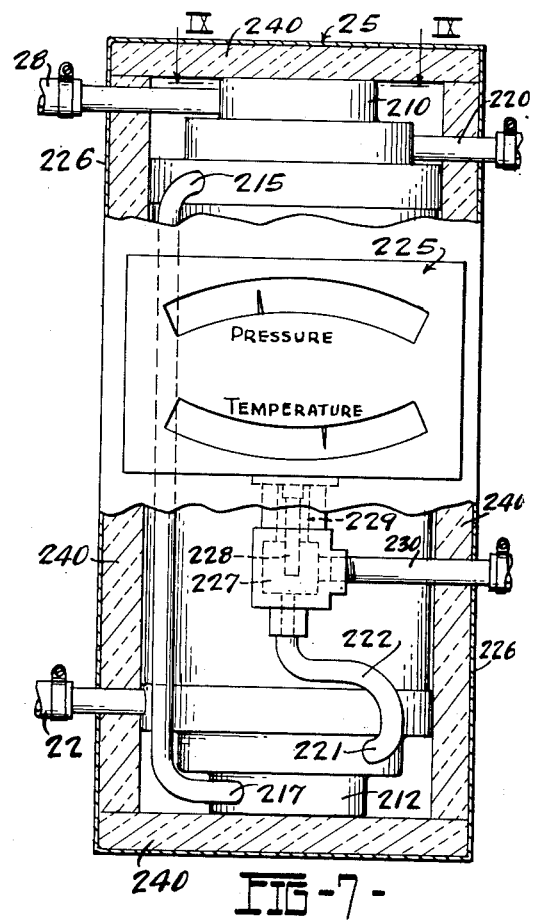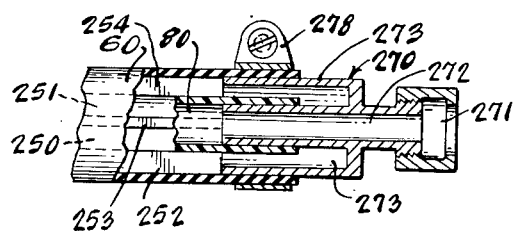
INVENTOR:
Richard H. Carter.
BY Hugh A. Kirk
ATTY.

United States Patent Office 2,762,652
Patented Sept. 11, 1956

2,762,652

HOT SPRAY PAINTING SYSTEM

Richard H. Carter, Fostoria, Ohio, assignor, by mesne assignments, to The De Vilbiss Company, Toledo, Ohio, a corporation of Ohio Application November 20, 1952, Serial No. 321,681

6 Claims. (Cl. 299—86)

This invention deals with a system for automatically controlling the temperature of fluids, solids in a molten state or semi-solids. More particularly, it relates to a system for accurately controlling the temperature of fluids from a remote point, such as for example controlling the temperature of organic inflammable liquid coatings, such as paints, enamels, lacquers, waxes and like materials in which the viscosity decreases with an increase in temperature, for application while hot and at a low viscosity by spraying, flow coating, dipping, or the like, to obtain better and quicker surface covering, spreading, penetration and adhesion.

It is an object of this invention to control temperatures of fluids in a simple, safe, efficient, effective and economical manner.

Another object is to provide a system for heating inflammable fluids, such as organic coating compositions including paints, lacquers, enamels and waxes, without the employment of expensive explosion proof equipment.

Another object is to provide a system for heating flowing fluids by means of a simple compact and light weight apparatus which is easily portable, readily cleanable, and does not entrap in the system a large quantity of the fluid to be heated.

Another object is to provide a heating apparatus for a plurality of different flowing inflammable fluids, such as different colored paints which may be selectively and rapidly brought to and maintained at a desired temperature regardless of the rate of flow of said fluids through said apparatus.

Another object is to provide a heat transfer method and apparatus for one or a plurality of inflammable fluids in which only one heater and only one temperature response device are employed, and they are located at a point remote from the inflammable fluids which are to be heated, thereby removing all fire hazards due to the presence of electrical devices and objects above the desired fluid temperature, away from the vicinity of the inflammable fluids.

Another object is to provide means for keeping the paint in a hot spray paint system at its desired temperature up to the very point where it is applied, such as to the nozzle of a spray gun, without the necessity of recirculation of the paint from the spray gun through the paint heater.

Generally speaking this invention comprises two fluid flow systems, a primary fluid flow system for a heat transfer medium and a second fluid flow system for the fluid which is to be heated. The heat transfer medium of the primary fluid flow system, preferably is non-inflammable and has a higher specific heat than that of the fluid of the secondary flow system. This heat transfer medium is circulated through ducts from a heat source to an efficient heat exchanger remote from said heat source, and back to the heat source. The rate of circulating the medium through the primary flow system is usually greater than the rate of flow of the fluid in the secondary flow system, and depends upon the specific heat of the medium, the amount of heat to be transferred in the heat exchanger to the secondary fluid flow system, and the efficiency of the heat exchanger. Since a very efficient heat exchanger is employed, only a single automatic heat responsive device, such as a thermostat with only one heat responsive element, is employed to control the temperature of the fluids flowing in both the primary and secondary flow systems of the apparatus. This single heat responsive device preferably is located at the heat source of the primary fluid flow system with its single heat responsive element in contact with both the cooler medium returning from the heat exchanger as well as the hotter medium on its way to the heat exchanger after it has been heated by the heat source. Thus, a differential of the heat in the medium of the primary flow system is automatically sensed providing a thermal feed back loop. Accordingly, as more heat is taken from the medium in the heat exchanger, more heat will be supplied automatically by the heater to the medium, up to a limit controlled by that portion of the heat responsive element exposed to the medium just after it has been heated.

The secondary fluid flow system comprises essentially a reservoir of the fluid, or liquid such as paint, which is to be heated by the apparatus of this invention, duct means for conducting the fluid from the reservoir through the heat exchanger mentioned above, to a discharge port, and means such as an air pump, air pressure, or the like for moving or circulating the fluid through the secondary flow system. If desired, the duct from the heat exchanger to the discharge port of the secondary flow system may be jacketed with a spur duct containing heat transfer medium from the primary fluid flow system, which spur duct may be connected either in series or in parallel with the heat exchanger.

The efficiency of the heat exchanger should be such that the relative temperatures of the fluids in the primary and secondary flow systems passing through the heat exchanger do not differ more than 15° F. and preferably less than 10° F.

One embodiment of an efficient heat exchanger which may be used to obtain this result comprises annularly spaced concentric tubes, the inner and outer annular tubular space formed being for the flow of the heat transfer medium of the primary fluid flow system, and the intermediate annular space being for the fluid which is to be heated of the secondary fluid flow system, so that parallel films of the heat transfer medium substantially surround both sides of a film of the fluid of the secondary flow system.

In order to effect better heat transfer between the fluids of the primary and secondary flow systems, the fluids are passed countercurrently through the heat exchanger and are guided in helical paths through the annular spaces thereof to produce turbulence and avoid stagnation.

However, the particular form of heat exchanger disclosed herein is the subject of my co-pending application, Serial No. 452,908, filed August 30, 1954, entitled Heat Exchanger.

The above mentioned and other features and objects of this invention and the manner of attaining them are given more specific disclosure in the following description of an embodiment of the invention taken in conjunction with the accompanying drawings, wherein:

Fig. 1 is a schematic diagram of an apparatus according to this invention as it may be applied to a plurality of different secondary fluid flow systems for heating liquid coatings, such as paint, for spraying;

Fig. 2 is a vertical section of the heater shown in Fig. 1;

Fig. 3 is a section along line III—III in Fig. 2;

Fig. 4 is a section along line IV—IV in Fig. 2;

Fig. 5 is a wiring diagram of the electric circuits employed in the heater of Fig. 2;

Fig. 6 is a graph showing curves of the comparative temperatures of a paint fluid in the secondary flow system with respect to its flow rate with and without thermal feed back for a given thermostat setting at the heater;

Fig. 7 is a vertical elevation with parts broken away of one of the heat exchanger units shown in Fig. 1;

Fig. 8 is a slightly modified vertical section of the heat transfer part of the heat exchanger device shown in Fig. 7 having exaggerated proportional dimensions for the purpose of illustration;

Fig. 9 is an end view of the heat transfer element taken along line IX—IX in Fig. 7;

Fig. 10 is a sectional view of a spur duct connection for circulating the heat transfer medium around the duct from the heat exchanger to the spray gun shown in the second heat exchanger system of Fig. 1; or along line X—X of Fig. 11;

Fig. 11 is an end view taken along line XI—XI in Fig. 10;

Fig. 12 is a sectional view of the other and outer end of the spur duct connection shown in the second heat exchange system of Fig. 1.

I. The system

Referring to Fig. 1 there is shown schematically one embodiment of an apparatus in which one heater unit 20 for a primary fluid flow system containing a heat transfer medium, is connected by means of manifold ducts 22 to a plurality of similar type heat exchanger units 25, which may be and preferably are located at remote points from that of the heater unit 20, such as for example on the other side of the fireproof walls 26. Each of the heat exchanger units 25 is connected to a manifold of return ducts 28 back to the heater unit 20, to form a complete circuit for the primary fluid flow system for the heat transfer medium. The manifold ducts 22 are provided with separate valves 29 at each connection to a heat exchanger unit 25 so that any one or more of said units may be employed at the same time. A plurality of separate heat exchanger units is advantageous when several colored paints are to be applied successively to an object, then each color may be separately used in turn and all may be heated by heat from a common heater unit 20.

For the purpose of illustration, four different types of secondary fluid flow circuit embodiments are shown in Fig. 1 connected to the four heat exchanger units 25 for heating organic liquid coatings, such as paints, which are to be applied by means of spraying. However, the secondary flow systems may also include systems for the application of coatings by dipping or flow coating, or for controlling the temperature of other fluids or semi-solids, inflammable or non-inflammable, without departing from the scope of this invention.

Referring to the first circuit embodiment shown at the top of Fig. 1, the paint to be heated is supplied from a pressure reservoir 30, to which pressure may be applied from a compressed air supply duct 31 through a valved branch duct 32, which supply duct 31 may be the same as that for a spray gun 35 through another valved branch duct 34. Below the liquid level in the reservoir 30, there extends a syphon tube 38 which is directly connected to duct 39 extending to the heat exchanger unit 25. The pressure in reservoir 30 thus causes the liquid to flow through duct 39 and the heat exchanger unit 25 and then on out through the duct 40 to the spray nozzle 41 of the spray gun 35. The spray gun 35 may be operated by means of a trigger 42 which permits a jet of hot paint from duct 40 to be sprayed from the nozzle 41. If desired, a combination pump 44 and motor 45 may be connected in an additional duct 46 between the nozzle 41 and the duct 39 whereby the paint which is not sprayed out through the nozzle 41 when the trigger 42 is not operated, will be circulated back through the heat exchanger unit 25 through the duct 46 by means of the pump 44 to maintain the temperature of the paint at all times at the nozzle 41. This motor 45 may be operated by air from a duct 47 also connected with the air supply duct 31. Thus, no source of electricity or other power means which might be a fire hazard to an inflammable fluid, such as paint, is present anywhere in the vicinity of the secondary flow system, or to the right side of the wall 26.

The second circuit embodiment shown in Fig. 1 is directed to another type of device for maintaining the desired paint temperature right to the nozzle end of a spray gun, or to the place where the paint is to be applied or used. In this embodiment there are shown ducts connected to the primary fluid flow system ducts 22 after the valve 29, which connects the heat transfer medium from the primary fluid flow system, either in series or in parallel by means of ducts 50, 51 and 52 and valves 53, 54 and 55, with a spur jacket hose or duct 60 extending between the outlet from the heat exchanger unit 25 and a nozzle 62 of a spray gun 65. Similarly as in the previously described circuit embodiment, air pressure from a supply duct 71 may be connected to both the gun 65 through duct 72 and a pressure reservoir 75 through duct 74, the pressure in the reservoir 75 forcing the paint from the reservoir through syphon 78, duct 79 through a heat exchanger unit 25 and thence through a central jacketed tube 80 to the nozzle 62 of the spray gun 65. The details of the connections to the jacketed tube 60 will be described later in combination with Figs. 10–12. If the primary fluid flow system to the spur duct 60 is to be connected in parallel with the heat exchanger 25, valves 53 and 54 are opened and valve 55 is closed, however, if the spur duct 60 is to be connected in series with the heat exchanger unit 25, valves 53 and 54 are closed and valve 55 is opened. If desired, the series connection between the spur tube 60 and the heat exchanger unit 25 may be made from the output of the heat exchanger unit 25 without departing from the scope of this invention, by the addition of a branch duct (not shown but similar to duct 52 and valve 53 at the inlet) from the outlet of the unit 25 before it connects with the branch duct 51.

In the third circuit embodiment in Fig. 1, there is shown a simple circuit illustrating how a heat exchanger unit 25 may be used for heating paint or any liquid in an open reservoir 90. This reservoir is shown herein to be a paint cup, which may be attached directly to a spray gun 95 after it is heated, and thus only an air supply duct 96 need be connected to the gun.

In the secondary flow system, a syphon tube 98 extends into the reservoir cup 90, which syphon is connected by a duct 99 to a pump 104, which may be similar to the pump 44 described above and operated by an air motor 105 similar to motor 95. The air motor 105 may be connected to an air supply duct 106, which duct may be connected to the same compressed air supply as the spray gun duct 96. The paint which is to be heated is thus continuously circulated from the cup 90 through duct 99, heat exchanger unit 25, and then back through duct 109 to the reservoir 90. Since the heat exchanger unit 25 is very efficient and heats the liquid to the desired temperature by one passage thereof through the exchanger unit, as is required in the previously above two described embodiments in Fig. 1, all of the paint in the reservoir 90 can readily be heated during the time that another cup 90 is being emptied by the spray gun 95.

The fourth and bottom circuit embodiment shown in Fig. 1, is also for circulation of a fluid from an open reservoir 110, such as by means of a pump 114 which may be operated by an air motor 115 connected to an air supply duct 116. The liquid to be heated is drawn through a syphon duct 117 in the reservoir 110 and forced through duct 118 into the heat exchanger unit 25 and thence out through duct 119 to the spray nozzle 122 of the spray gun 125. This circuit may also have a return duct 126 from the nozzle 122 back to the inlet side of pump 114 so that the temperature of the liquid at the nozzle 122 will be maintained at the desired temperature whether or not the nozzle is open. This embodiment illustrates how a spray gun hot paint system can be connected to an open can of paint 110 and the air pressure used for propelling the paint from the gun 125 may also be used for operating an air motor 115 and pump 114 to force the paint from the open can through the system. In this system no pressure reservoir such as reservoir 30 or 75 is required as described above, and the syphon duct 117 may be placed into any open paint can. This system is also applicable for molten solids such as waxes wherein a pool of liquid wax may be melted in container 110 by a separate heater and the syphon duct 117 may then be inserted in such a pool.

Although different circuits are shown for each of the four system embodiments in Fig. 1, any feature of any one of them may be applied to any one or more of the other system embodiments without departing from the scope of this invention. For example, the spur jacket duct 60 shown in the second embodiment system may be employed in any of the other three embodiments, and the open reservoir 110 and pump 114 of the fourth embodiment may be employed instead of the pressure reservoirs 30 and 75 of the first and second embodiments, respectively.

II. The heater unit

Referring now to the primary fluid flow system, the heater unit 20 shown in Fig. 1 is shown enlarged and in vertical section in Fig. 2 disclosing a specific embodiment of a heating element, a circulating device and a temperature control means. The heating element may be heated by steam, electricity, or the like, however, the element shown herein for heating the secondary flow fluid or heat transfer medium, is of the electric resistance type having bent U-shaped tubular heating element 130 which is mounted in a container 131 filled with the heat transfer medium 132. The container 131 is partly divided by a baffle 133 (see also Fig. 4) which separates the fluid intake duct 134 and heating element 131 from the fluid outlet duct 135. The heating element 130 is completely submerged and below the level of the heat transfer medium 132 in the container 131, which level may be substantially maintained by locating the outlet duct 135 just below said level and above the heating element 130. The container 131 is preferably surrounded with a suitable insulation material or fiber board 140 so as to retain as much heat in the system as possible to increase its efficiency. A housing 141 which comprises the unit 20 may enclose the container 131 and its insulation 140 as well as a circulating pump 145, which pump may be driven by an electric motor 146 provided with a fan 147 to cool the motor by circulating air through the louvres 148 in the housing 141. This motor and pump assembly may be mounted on a bracket 149 attached to the side of the housing 141. Also mounted in the housing 141 may be a relay 150 which controls the electric power supply from conductors 151 for the heating element 130.

The wiring diagram for the electrical circuits in the heater unit 20 (see also Fig. 5) are connected so that the relay 150 must be energized to close relay switch 152 in heater circuit 153 before the heater element 130 can be energized. This relay 150 has its coil connected in a series circuit 155 with a thermostat controlled switch 156 and a manual switch 157. As soon as the double pole switch 158 in supply conductors 151 is closed so that electricity is supplied to the heater unit 20, the motor 146 starts and rotates pump 145 to circulate the medium 132 in the system. In parallel with this circuit for motor 146, are both the heater circuit 153 and the relay circuit 155. However, before the heating element 130 can be energized it is necessary that both the manual switch 157, which may be mounted on the side of the container 141, and the thermostat switch 156 are closed so that the relay 150 may be energized to close relay switch 152. The thermostat switch 156 may be adjusted by manual means 158 so that it will be closed when the medium 132 cools below a predetermined temperature. Accordingly, when the system is cold, or not in use, the switch 156 will be closed and such would close the circuit to the relay 150 if it were not also for manual switch 157.

The thermostat switch 156 is operated by a single heat responsive element 160, the proper location of which in the container 131 is an essential and important feature of this invention. This single element 160 is so mounted and positioned that it is exposed to both the incoming medium through duct 134 as well as the outgoing medium through duct 135 and to do so it extends through and from both sides of the baffle 133. Preferably, a major portion of the element 160 is exposed to the cool medium 132 just as it returns through duct 134, while a minor portion only is exposed to the hot medium just before it leaves the container 131 through duct 135. Thus the thermostat 160 will be sensitive to the cooler medium and be responsive to the amount of heat withdrawn from the medium at the heat exchanger unit 25, so that more heat can be fed back into the medium by the heating element 130 to compensate automatically for any, all, and varying amounts of heat transferred at the heat exchanger unit 25.

The advantage of this thermal feed back is graphically shown in Fig. 6 in which comparative curves show the temperatures of a secondary flow fluid such as paint with respect to its rate of flow through the heat exchanger unit 25, when the thermostat is placed as shown in Fig. 2 to provide thermal feed back, and when the thermostat is placed only in the outlet duct 135 without thermal feed back. Thus, for a given thermostat setting for the manual adjustment 158 with thermal feed back, a much greater flow rate of the paint in the secondary flow system may be used and still heat the paint to its desired temperature in the heat exchanger unit 25 than without feed back. This enables the paint to be heated at any fast, slow or intermittent rate if it is used without the employment of larger and much more expensive and hazardous apparatus. If the thermostate were only placed in the return or inlet duct 134, it would cause even more heat to be added to the medium, but the amount of added heat would not be detected by the thermostat until the medium had taken the time to flow out to the heat exchanger unit 25 and back, which time lag would cause excessive oscillation in temperature of the outgoing medium from the heater unit 20 and could easily produce overheating both of the medium as well as the fluid in the secondary flow system.

Thus, since thermostat 160 is exposed in part also to the medium after it is heated by the heating element 130, an upper limit to the maximum amount of heat fed into the medium 132 is obtained which permits rapid response to heat requirements and accordingly stabilizes the operation of the system, preventing excessive oscillations in temperature as well as overheating of the medium and/or the fluid in the secondary flow system for any given rate of circulation of the medium through the primary flow system.

The primary flow system may be either open or closed but a certain amount of contained air in the system above the level of the medium 132 in container 131 is provided for expansive purposes. For the primary flow system as shown herein, a small fountain chamber 165 having a transparent or glass cylindrical wall 166 may be located on top of the housing 141, into which the return line 28 from the heat exchanger unit 25 may flow through duct 167 and overflow duct 168. Thus through the wall 166 one can see at a glance if the medium 132 is circulating through the system before the switch 157 controlling the heating element 130 is closed and the heat is turned on. At the top of the chamber 165 there may be provided a bleeder and filling plug 169. From the chamber 165 there is provided a bottom discharge port 171 (see Fig. 3) to which is connected the return duct 134 entering the chamber 131. Since the duct 134 extends below the level of the medium 132 in the container 131 to a point adjacent the thermostat 160, a separate duct (not shown) or a hole 172 may be provided in the side of duct 134 above said level, so that a differential of air pressure will not occur between the top of container 131 and the chamber 165 to prevent free flow of the medium through the duct 134.

In the circuit of the primary flow system, there also may be provided a safety device to prevent any build up of pressure in the system which might cause damage, such as a pressure relief valve 175 which may be attached to duct 167 and project outside of the housing 141.

The flow circuit of the medium through the present embodiment of the primary flow system is from the container 131, through outlet duct 135, circulating pump 145 and on through the ducts 22 to the heat exchanger unit or units 25, and then back through ducts 28, 167 and 168, fountain chamber 165, and down through the intake return duct 134 into the container 131, by a portion of the thermostat 160 and along and around heating element 130 to the bottom of the container 131 and then up behind the baffle 133 by another portion of the thermostat 160 and again through the duct 135.

III. The heat exchangers

In order for the system of the present invention to operate correctly and efficiently it is necessary that a very efficient heat exchanger be employed. One embodiment of such a heat exchanger is shown in Figs. 7, 8 and 9, in which Fig. 7 is an enlarged view of the heat exchanger unit 25 shown in Fig. 1, with parts of the front thereof broken away to show the parts and connections comprising the unit. The principle of this heat exchanger is that the heat transfer medium and the fluid which is to be heated by it are passed in thin rapidly flowing films separated by heat conducting material, so that as intimate and as turbulent a surface contact as possible may be effected between the fluids.

One type of heat exchange apparatus which has been found to be effective in the apparatus of this invention comprises four concentric heat conducting tubes 200, 202, 204 and 206 of thin metal such as copper, steel, brass, or the like, in which the annular cylindrical spaces 201, 203 and 205 between the tubes are comparatively thin so that only the thickness of a wire, such as wires 207, 208 and 209, helically wrapped around each inner tube, spaces it from the inside diameter of the next outer concentric tube. These annular spaces 201, 203 and 205 for the film thickness are proportionally exaggerated in Fig. 8 for the purpose of clear illustration. The outer two tubes 204 and 206 are successively shorter in length than inner two tubes 200 and 202 of equal length, to provide stepped exposed outer surfaces to which the ducts connecting the annular spaces may be easily joined. Over the stepped ends there may be stepped caps 210 and 212 which snugly fit over the outside diameter of each tube 202, 204 and 206 and may be soldered thereto to form fluid tight joints separating the annular spaces. The central portion 214 of the tube 200 does not necessarily need to be soldered at its ends to the caps 210 and 212 and accordingly may be filled with stagnant heat transfer medium to act as a heat retaining mass, however, this central portion 214 may be filled with insulation if the ends of the tube 200 close the annular space 201. The helical coils of wires 207, 208 and 209 also act as directing vanes for the fluids flowing in the annular spaces thereby increasing the rate of flow and insuring turbulent contact of the fluids with the surfaces of the tubes. For example, one effective heat exchanger in which water is used as the medium to heat paint, is about one and a half feet long, about 2 inches in outside diameter, the radial spacing between the tubes is about .060 inch, and the axial spacing between the helices of the wires is say about 2 inches.

As disclosed the heat transfer medium from the heater unit 20 entering duct 22 at the bottom of the outer tube 206 will helically pass up through the outer annular space 205, out port 215 connected by a hose or duct 216 to the inlet port 217 at the bottom of the tube 202, helically up through the inner annular space 201 and then out through the return duct 28 at the top of tube 202 back to the heater unit 20.

Countercurrent to the upward flow of the medium through the annular helical spaces 201 and 205 is the flow of the fluid to be heated by the heat exchanger, such as for example paint for a hot paint system. In this case, the paint is introduced through the top intake port 220 to tube 204 and thence passes helically downwardly through the intermediate annular space 203 surrounded both on the inside and outside by the countercurrently flowing medium in annular spaces 201 and 205, and then is withdrawn through the outlet port 221 at the bottom of the tube 204. From the outlet duct 221 the heated fluid or paint may be connected through a hose or duct section 222 to a pressure-temperature gauge assembly 225, which may be mounted in a side of the housing 226 for the heat exchanger unit 25. This assembly 225 may comprise a chamber 227 into which a temperature responsive device 228 of the temperature gauge may extend, which device is surrounded by a channel 229 extending to the pressure gauge of the assembly 225. From the chamber 227, the paint then flows out through a discharge duct 230, which in turn may be connected to any one of the spray gun connections 40, 60, 109 or 119 shown in Fig. 1, or any other apparatus for a heated fluid. Correspondingly, the intake port 220 may be connected to any one of the intake ducts 39, 79, 99 or 118 shown in Fig. 1, or other suitable intake ports for a fluid which is to be heated by circulation through the secondary flow section of the heat exchanger unit 25.

The connections or ducts 22, 28, 215, 216, 217, 220, 221, 222 and 230 may be of screw threaded pipe, flexible hoses, with or without clamps as required, or any suitable fluid carrying conduits insulated or not, if desired. The heat exchanger tubes including their connecting ducts 216 and 222 may be surrounded by a heat insulation material 240 (similar to 140 in Fig. 2) inside housing 226 to reduce heat losses in the system.

The ports 215 and 217 are shown at an angle of 45° to the ports for ducts 22 and 28, and port 221 is shown at an angle of 45° to the port 220 in Figs. 7 and 9 to save space for the connections shown in the housing 226.

If desired the heat exchange fluid may be passed in parallel through the annular spaces 201 and 205 of the heat exchanger instead of in series as shown without departing from the scope of this invention, however, it is desirable that the flow of the heat transfer medium through the heat exchanger always be countercurrent to that of the flow of the paint or fluid to be heated in the heat exchanger in order that the greatest differential in temperature between the fluids of the primary and secondary flow systems will occur at all points throughout the heat exchanger, thus effecting a greater rate of heat transfer between the fluids.

It is essential that the mass fluid flow for the heat transfer medium through the two annular spaces 201 and 205 of the heat exchanger be more than that of the mass countercurrent flow for the paint or fluid to be heated through the space 203. This flow differential is such that the rate of heat flow carried in the transfer medium generally varies between about 50% and 300% more than the rate of heat carried out by the paint or fluid to be heated. The variations in this amount depend upon the efficiency of the system, spray gun nozzle outlet or discharge port capacity, the relative specific heats of the fluids, etc. The heat transfer medium which is employed should have a specific heat greater than .5 and preferably about 1.0. However, some effective heat transfer mediums are water, soyabean oil, mineral oil, ethylene glycol, and the like. For example water has been found effective as a heat transfer medium for a hot paint system in which the paint is to be heated to a temperature generally between 150° F. and 200° F. and preferably about 170° F.; since water has a relatively high specific heat, i. e. approximately 1, which is about twice that of an oil, and also has a low viscosity so it can be circulated through the system at higher rate with a relatively smaller motor.

Accordingly with such an efficient heat exchanger the temperature of the paint or fluid to be heated which passes through the annular space 203 of the heat exchanger, can thus accurately be controlled to within less than 15° F. and generally within less than 10° F. of the temperature of the heat transfer medium at a remote point, namely just as it comes from the heater in the heater unit 20. Because of this highly efficient heat exchanger and the automatic thermal feed back control by the thermostat, the fluid being heated can be maintained at a given temperature whether the fluid is intermittently or continuously flowed through the heat exchanger unit 25.

The safety from fire hazard of this system is illustrated by the fact that the heat transfer medium is never much above the temperature to which the fluid to be heated is to be heated and that the medium is in an independent closed system never coming into direct contact with the fluid to be heated except through the metal walls of tubes 202 and 204 in the heat exchanger unit 25. Also the secondary flow system may be closed to the atmosphere while the fluid flowing therein is being heated.

IV. Jacket spur duct

As previously described in connection with the second modification shown in Fig. 1, the duct 60 between the heat exchanger unit 25 and the spray gun nozzle 62 of the spray gun 65, may be a jacket spur duct comprising an annular tube provided with longitudinal channels for the flow of the heat transfer medium around the outside of the central paint duct 80, so as to keep the paint in duct 80 hot until it is actually sprayed. Such jacket spur duct is particularly desirable if the fluid to be heated is normally a solid as a wax or is a fluid which is discharged intermittently and/or if it has to pass through a comparatively long hose between the heat exchanger unit 25 and discharge port where it is used. Such a jacket spur duct also eliminates the necessity for having a circulating system such as the additional ducts 48 and 119 in Fig. 1 for the paint for recycling the paint back to the heat exchanger unit 25 to keep the paint hot when the spray gun is not spraying. Some spur ducts and connections which may be used for such a flexible jacket spur duct are shown in Figs. 10–12 or in my copending U. S. application Serial No. 331,607, filed January 16, 1953.

Fig. 10 herein shows a vertical section of a fitting for an end of the duct 60 preferably adjacent the heat exchanger outlet port 230 (see Fig. 7). The flexible paint tube 80 thus may be surrounded with another flexible tube 60 of larger diameter (see Fig. 11) which larger tube 60 may be provided with two pairs of equal and separate channels 250 and 251 separated by inwardly extending ridges 252, 253, 254 and 255. One adjacent pair of channels 250 may be for the medium flowing in one direction as out through the duct 60 and the other pair 251 for the return of the medium back through the duct 60. The purpose of having the four partitions 252, 253, 254 and 255 equally dividing the semi annular channels 250 and 251 is so that when the flexible tube 60 is bent it will not collapse the channels 250 and 251 to stop the flow of fluid through them.

The end fitting or member 260 which connects the ends of the ducts 60 and 80 with the outlet port 230 from the heat exchanger unit 25, is preferably provided with an inner straight through tubular portion 261, an outer annular portion 262 diametrically divided by four slots corresponding with the ridges 252, 253, 254 and 255 of the hose duct 60. Each division of said outer portion 262 may be provided with a longitudinal hole, adjacent pairs of which holes 263 and 264 connect with radially extending ports 265 and 266 from each semi-annular section of said member 260 for the connection of ducts 50 and 51, respectively, for the fluid medium inlet and outlet. The ends of the flexible tubes 60 and 80 fit over the outside diameters of the portions 262 and 261, respectively, the former having the diametrical ridges 252, 253, 254 and 255 fitting in said slots in portion 262. The outside of the flexible tube 60 may be clamped to the fitting 260 by means of a suitable hose clamp 268.

At the spray gun nozzle 62 or discharge end of the ducts 80 and 60, there may be provided a spur end or medium return fitting 270 shown in Fig. 12. The fitting 270 may be connected to the spray gun 65 at 271 and comprise an inner straight through tubing portion 272, and an outer annular portion 273. The outer ends of the flexible ducts 60 and 80 are fitted over the outside diameters of the portions 272 and 273, and a hose clamp 278 may be placed around the outside end of the duct 60. The ridges 252, 253, 254 and 255 adjacent this end of the hose or duct 60 are cut back to expose only the outer ring of the tube 60 whereby it may be fitted over the outside of the annular portion 273. Thus, since there are no ridge partitions in the fitting 270, the medium flowing out one pair of channels 250 will flow around the annular portion 273 and back through the other pair of channels 251.

Although the above apparatus is shown in combination with a hot spray painting system, it also may be used for controlling the temperature by the heating or the cooling of other fluids, molten solids or semi-solids, which fluids may or may not be inflammable, may or may not be solid at atmospheric temperatures, but which may be fluidized or maintained as fluids in the system.

While there is described above the principles of this invention in connection with specific apparatus, it is to be clearly understood that this description is made only by way of example and not as a limitation to the scope of this invention.

What is claimed is:

1. A hot spray painting system having delivery means supplying paint in stream form under pressure, a spray gun, paint conveying means between the delivery means and the spray gun, said paint conveying means providing a narrow passage throughout its full length, an elongated heat exchanger through which the paint conveying means longitudinally passes, a narrow, longitudinal passage for a heat transfer liquid, through the heat exchanger in close proximity to the conveying means, a heating device for the heat transfer liquid, said heating device being narrow and elongated, an elongated electrical heating element positioned longitudinally within the heating device, an outlet conduit from the heating device to the heat exchanger, a return conduit from the heat exchanger to the heating device, a pump rapidly circulating the heat transfer liquid lengthwise through the heating device and to and from the heat exchanger, a thermostat associated with the electrical heating element constantly controlling within close limits the temperature of the heat transfer liquid and an elongated heat responsive element projecting into the heating device and reporting the temperature of the heat transfer liquid to the thermostat; said hot spray painting system characterized by the fact that the heating device, the pump, the outlet and return conduit and the heat exchanger, comprising the circuit of the heat transfer liquid, together have a low volumetric capacity and provide a passage narrow throughout its length uninterrupted by a reservoir or collecting space for the heat transfer liquid, whereby a small volume of heat transfer liquid fills the circuit and in its entirety passes therethrough in continuous stream form carrying heat direct from the heating element to the narrow stream of paint passing through the heat exchanger.

2. A hot spray painting system having delivery means supplying paint in stream form under pressure, a spray gun, paint conveying means between the delivery means and the spray gun, said paint conveying means providing a narrow passage throughout its full length, a heat exchanger through which the paint conveying means passes, a narrow passage through the heat exchanger for a heat transfer liquid, a heating device for the heat transfer liquid, an electrical heating element positioned within the heating device, an outlet conduit from the heating device to the heat exchanger, a return conduit from the heat exchanger to the heating device, a pump rapidly circulating the heat transfer liquid through the heating device and to and from the heat exchanger, a thermostat associated with the electrical heating element constantly controlling within close limits the temperature of the heat transfer liquid and an elongated heat responsive element projecting into the heating device and reporting the temperature of the heat transfer liquid to the thermostat, said heat responsive element extending in close proximity to the heating element; said hot spray painting system characterized by the fact that the heating device, the pump, the outlet and return conduits and the heat exchanger, comprisnig the circuit of the heat transfer liquid, together have a low volumetric capacity and provide a passage narrow throughout its length uninterrupted by a reservoir or collecting space for the heat transfer liquid whereby a small volume of heat transfer liquid fills the circuit and in its entirety passes therethrough in continuous stream form carrying heat direct from the heating element to the narrow stream of paint passing through the heat exchanger.

3. A hot spray painting system according to claim 2 in which the circuit of the heat transfer liquid includes a narrow outgoing passage along the paint conveying means and closely associated therewith from the heat exchanger toward the spray gun and a narrow returning passage integrally continuous with the outgoing passage cooperating to maintain the temperature of the paint as it travels from the heat exchanger to the spray gun.

4. A hot spray painting system having delivery means supplying paint in stream form under pressure, a spray gun, paint conveying means between the delivery means and the spray gun, said paint conveying means providing a narrow passage throughout its full length, an elongated heat exchanger through which the paint conveying means longitudinally passes, a narrow, longitudinal passage for a heat transfer liquid through the heat exchanger in close proximity to the conveying means, a heating device for the heat transfer liquid, said heating device being narrow and elongated, an elongated electrical heating element positioned longitudinally within the heating device, an outlet conduit from the heating device to the heat exchanger, a return conduit from the heat exchanger to the heating device, a pump rapidly circulating the heat transfer liquid lengthwise through the heating device and to and from the heat exchanger, a thermostat associated with the electrical heating element constantly controlling within close limits the temperature of the heat transfer liquid; and an elongated heat responsive element projecting into the heating device and reporting the temperature of the heat transfer liquid to the thermostat, said heat responsive element having a first portion in the line of flow of the heat transfer liquid entering the heating device, and a second portion in the line of flow of the heat transfer liquid after it has passed along the heating element; the heating device, the pump, the outlet and return conduits and the heat exchanger, comprising the circuit of the heat transfer liquid, together having a low volumetric capacity and providing a passage narrow throughout its length and uninterrupted by a reservoir or collecting space for the heat transfer liquid, whereby a small volume of heat transfer liquid fills the circuit and in its entirety passes therethrough in continuous stream form carrying heat direct from the heating element to the narrow stream of paint passing through the heat exchanger.

5. A hot spray painting system having delivery means supplying paint in stream form under pressure, a spray gun, paint conveying means between the delivery means and the spray gun, said paint conveying means providing a narrow passage throughout its full length, an elongated heat exchanger through which the paint conveying means longitudinally passes, a narrow, longitudinal passage for a heat transfer liquid through the heat exchanger in close proximity to the conveying means, a heating device for the heat transfer liquid, said heating device being narrow and elongated, an elongated electrical heating element positioned longitudinally within the heating device, an outlet conduit from the heating device to the heat exchanger, a return conduit from the heat exchanger to the heating device, a pump rapidly circulating the heat transfer liquid lengthwise through the heating device and to and from the heat exchanger, a thermostat associated with the electrical heating element constantly controlling within close limits the temperature of the heat transfer liquid and an elongated heat responsive element projecting into the heating device and reporting the temperature of the heat transfer liquid to the thermostat, said heat responsive element positioned to intercept the flow of the heat transfer liquid entering the heating device and extending in close proximity to a part of the heating element; the heating device, the pump, the outlet and return conduits and the heat exchanger, comprising the circuit of the heat transfer liquid, together having a low volumetric capacity and providing a passage narrow throughout its length and uninterrupted by a reservoir or collecting space for the heat transfer liquid, whereby a small volume of heat transfer liquid fills the circuit and in its entirety passes therethrough in continuous stream form carrying heat direct from the heating element to the narrow stream of paint passing through the heat exchanger.

6. A hot spray painting system having delivery means supplying paint in stream form under pressure, a spray gun, paint conveying means between the delivery means and the spray gun, said paint conveying means providing a narrow passage throughout its full length, an elongated heat exchanger through which the paint conveying means longitudinally passes, a narrow, longitudinal passage for a heat transfer liquid through the heat exchanger in close proximity to the conveying means, a heating device for the heat transfer liquid, said heating device being narrow and elongated, an elongated electrical heating element positioned longitudinally within the heating device, an outlet conduit from the heating device to the heat exchanger, a return conduit from the heat exchanger to the heating device, a pump rapidly circulating the heat transfer liquid lengthwise through the heating device and to and from the heat exchanger, a thermostat associated with the electrical heating element constantly controlling within close limits the temperature of the heat transfer liquid and an elongated heat responsive element projecting into the heating device and reporting the temperature of the heat transfer liquid to the thermostat, said heat responsive element extending in close proximity of the heating element, into the line of flow of the heat transfer liquid entering the heating device and having a portion in the line of flow of the heat transfer liquid after it has traveled along the heating element; the heating device, the pump, the outlet and return conduits and the heat exchanger, comprising the circuit of the heat transfer liquid, together having a low volumetric capacity and providing a passage narrow through its length and uninterrupted by a reservoir or collecting space for the heat transfer liquid, whereby a small volume of heat transfer liquid fills the circuit and in its entirety passes therethrough in continuous stream form carrying heat direct from the heating element to the narrow stream of paint passing through the heat exchanger.

References Cited in the file of this patent

UNITED STATES PATENTS

| | | | |
|---|---|---|---|
| 1,393,452 | Recklinghausen | Oct. 11, | 1921 |
| 1,639,051 | Munday | Aug. 16, | 1927 |
| 2,165,094 | Fette | July 4, | 1939 |
| 2,366,150 | Yount | Dec. 26, | 1944 |
| 2,378,184 | Carlson | June 12, | 1945 |
| 2,461,766 | Peeps | Feb. 15, | 1949 |
| 2,480,302 | Pankow | Aug. 30, | 1949 |
| 2,530,799 | Arvintz | Nov. 21, | 1950 |
| 2,533,486 | Marshall | Dec. 12, | 1950 |
| 2,545,966 | McQuitty | Mar. 20, | 1951 |
| 2,546,741 | Grossman | Mar. 27, | 1951 |

FOREIGN PATENTS

| | | | |
|---|---|---|---|
| 343,231 | Great Britain | Feb. 19, | 1931 |
| 407,577 | Great Britain | Mar. 22, | 1934 |

OTHER REFERENCES

Therm-o-spray literature, Manufacturer Svenska Maskin A. B. Greiff, Stockholm, Swden. Received in Division 30, United States Patent Office, March 31, 1952 (Copy in 299–86.)